(12) United States Patent
Bharadwaj et al.

(10) Patent No.: US 12,711,795 B1
(45) Date of Patent: Aug. 18, 2026

(54) ENHANCED BEAM SEARCH DECODING FOR TRANSFORMER-BASED OCR WITH PROBABILITY SCORE OPTIMIZATION

(71) Applicant: U.S. Bank National Association, Minneapolis, MN (US)

(72) Inventors: Raj M. Bharadwaj, Plymouth, MN (US); Vadim V. Petruk, Minneapolis, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/406,649

(22) Filed: Dec. 2, 2025

(51) Int. Cl.
*G06V 30/19* (2022.01)
*G06V 30/146* (2022.01)
*G06V 30/166* (2022.01)

(52) U.S. Cl.
CPC .... *G06V 30/19127* (2022.01); *G06V 30/1473* (2022.01); *G06V 30/166* (2022.01)

(58) Field of Classification Search
None
See application file for complete search history.

(56) References Cited

U.S. PATENT DOCUMENTS

| | | | | |
|---|---|---|---|---|
| 12,175,438 | B1 * | 12/2024 | Franklin | G06N 20/00 |
| 2019/0130230 | A1 | 5/2019 | Kang | |
| 2022/0172518 | A1 | 6/2022 | Tang | |
| 2022/0327816 | A1 | 10/2022 | Nguyen | |
| 2025/0342710 | A1 | 11/2025 | Yadlapalli | |

(Continued)

FOREIGN PATENT DOCUMENTS

| | | |
|---|---|---|
| CA | 3017647 C | 2/2019 |
| CN | 114444593 | 5/2022 |
| CN | 117975028 | 5/2024 |

(Continued)

OTHER PUBLICATIONS

Development of Chimp Optimization Algorithm and Adaptive Shuffle Attention Net for Automated Bank Cheque and Signature Verification, by Salagar, et al., Web Intelligence 2025, vol. 23(3) 350-373 © The Author(s) 2025 (Year: 2025).*

(Continued)

*Primary Examiner* — Vikkram Bali
(74) *Attorney, Agent, or Firm* — Merchant & Gould P.C.

(57) ABSTRACT

Systems, methods, and computer-readable media for optical character recognition of imagery employ transformer-based models with enhanced beam search decoding. A system processes an input image through an encoder to generate visual features, then performs sequential decoding using a decoder that generates raw logit scores at each step. Candidate output sequences are generated and expanded by selecting and appending tokens based on the raw logit scores. The logit scores are converted to normalized confidence scores via a normalization function, and the generated candidate sequences are then reranked by averaging the logit scores across all tokens in each sequence. The sequence having maximum average confidence score among the reranked candidates is selected as the final recognized text output. This logit-based generation followed by confidence-based reranking improves recognition accuracy for amounts containing special characters, irregular spacing, and other challenging features.

20 Claims, 10 Drawing Sheets

(56) References Cited

U.S. PATENT DOCUMENTS

| | | | | |
|---|---|---|---|---|
| 2025/0391185 | A1* | 12/2025 | Hariharan | G06F 40/109 |
| 2026/0045112 | A1* | 2/2026 | Cantrell | G06N 3/045 |

FOREIGN PATENT DOCUMENTS

| | | |
|---|---|---|
| CN | 118196397 B | 7/2024 |
| CN | 120014647 | 5/2025 |
| WO | 2020/133442 | 7/2020 |

OTHER PUBLICATIONS

U.S. Appl. No. 19/267,178 entitled "Mobile Check Deposit", Inventor: Marlen L. Foster, filed Jul. 11, 2025, 237 pages.

* cited by examiner $$Score(y,x)^{per\ step} = Top_s \left( \frac{1}{y} \sum_{t=1}^{y} P(y_t \mid y_1 \ldots y_{t-1}, x) \right)$$

$x$ = Image
$y$ = Candidate Output Sequence
s = Beam Width Parameter (e.g., s=5)

$Top\ Beam = Max(Top_s)$

FIG. 5

ENHANCED BEAM SEARCH DECODING FOR TRANSFORMER-BASED OCR WITH PROBABILITY SCORE OPTIMIZATION

BACKGROUND

Example embodiments described herein relate to optical character recognition (OCR) systems and methods, particularly for extracting text regions exhibiting low OCR confidence or recognition difficulty from images, such as documents.

Traditional OCR systems have employed various approaches to extract text from document images. Some early systems, for example, relied on template-matching and rule-based methods, which were later supplemented by machine learning approaches. However, these conventional OCR systems still often struggle, such as with the specific challenges presented by processing specialized documents (e.g., checks), which may include varying fonts, print quality, low image quality, background patterns, interference from handwritten pen strokes, and the presence of security features.

More recently, transformer-based OCR models, employing encoder-decoder structures, have emerged as a promising approach for text recognition tasks. For example, some transformer-based models use vision transformer encoders to process image patches and text transformer decoders to generate character sequences in an autoregressive manner. The encoder converts input images into patch embeddings, which are then processed to generate text output through step-by-step decoding.

In conventional OCR decoding approaches, including those used with transformer-based architectures, the standard method for text generation is greedy decoding (also known as argmax decoding). In greedy decoding, at each step of the decoding process, the model selects the character with the highest predicted probability (or logit score) and uses this selection as input for the next decoding step. While this approach is computationally efficient, it suffers from a significant limitation in certain use cases: if the model makes an incorrect prediction at any step, particularly early in the sequence, it becomes increasingly likely to continue down an incorrect path, as subsequent predictions are conditioned on the previous (potentially erroneous) outputs.

This limitation is particularly problematic when processing certain formats of numbers (e.g., check amounts), which can contain challenging elements that can confuse OCR models. For example, check amounts frequently include special characters such as dollar signs ($), asterisks (*) used as fill characters, periods (.) for decimal points, and varying amounts of whitespace. These elements are often underrepresented in general text training datasets, leading to lower confidence predictions that can derail the greedy decoding process.

Furthermore, the sequential nature of transformer decoding means that early errors compound throughout the sequence. When processing a number like "**$225.49", if the model incorrectly interprets the initial asterisks or dollar sign with low confidence, the greedy approach will commit to this interpretation and generate subsequent characters based on this potentially incorrect foundation.

Beam search represents an alternative to greedy decoding in sequence generation tasks. In beam search, instead of selecting the highest-probability token at each step, the algorithm maintains multiple candidate sequences (beams) and explores several possible paths simultaneously. However, conventional beam search implementations typically use raw logit scores for ranking candidate sequences, and the final selection is often based on the cumulative sum of these unnormalized values across the sequence length. Normalized confidence-based sequences provide an alternative to logit based scoring by bounding the value and enabling each character to contribute equally to the decoding process.

Despite the theoretical advantages of beam search over greedy decoding, its application to OCR tasks, particularly for financial document processing, remains limited. The specific challenges of check amount recognition-including the presence of special characters, variable spacing, and security features-create unique requirements that are not adequately addressed by standard OCR implementations using existing transformer-based architectures.

There exists a need in the art for improved OCR systems and methods that can more accurately extract characters from difficult or complex documents (e.g., monetary amounts from check images), particularly in mobile deposit applications where processing accuracy and efficiency is important. Such systems should be capable of handling the specific challenges presented by document formatting or other issues while maintaining acceptable processing speeds for real-time applications.

SUMMARY

In some embodiments, a computer-implemented method is provided for optical character recognition of imagery. The method comprises receiving an input image depicting an amount and processing the input image through an encoder of a transformer-based optical character recognition model to generate encoded visual features. Sequential decoding of the amount is performed using a decoder of the transformer-based optical character recognition model.

In some embodiments, the sequential decoding comprises, at each decoding step, generating output values comprising raw logit scores for tokens in a vocabulary of possible tokens, where the output values are conditioned on the encoded visual features and any previously decoded tokens. The method further comprises converting the output values from raw logit scores to normalized confidence scores using a normalization function.

In some embodiments, a plurality of candidate output sequences is generated based on raw logit scores and maintained during the sequential decoding, with each candidate output sequence comprising one or more decoded tokens. For each candidate output sequence, a cumulative confidence score (e.g., calculated by averaging) is calculated by averaging the logit scores across all tokens of that candidate output sequence to enable reranking of the generated candidate sequences. A final output sequence is selected from among the plurality of candidate output sequences based on the cumulative confidence scores after reranking, where the final output sequence has a maximum cumulative confidence score. The final output sequence is then output as a recognized textual representation of the amount.

In some embodiments, the final output sequence selected based on the maximum cumulative confidence score differs from a candidate output sequence that would have a highest cumulative logit score if cumulative logit scores were calculated by averaging the raw logit scores without conversion to normalized confidence scores.

In some embodiments, maintaining the plurality of candidate output sequences comprises, at each decoding step, expanding each candidate output sequence based on the raw logit scores by selecting possible next tokens according to logit values. For each expanded candidate output sequence, an updated cumulative confidence score is calculated by averaging normalized confidence scores across all tokens in that expanded candidate output sequence. The expanded candidate output sequences are reranked based on the updated cumulative confidence scores.

In some embodiments, the predetermined number of highest-scoring expanded candidate output sequences is defined by a configurable beam width parameter (denoted as "s" in mathematical notation). In certain implementations, the beam width parameter is set to a value of at least 3, or in some cases to a value of 5.

In some embodiments, processing the input image through the encoder comprises dividing the input image into a plurality of image patches, flattening each image patch into a one-dimensional vector, applying position embeddings to the flattened vectors to encode spatial position information, and processing the flattened vectors with the position embeddings through a series of transformer encoder layers to generate the encoded visual features.

In some embodiments, the vocabulary of possible tokens includes numerical digits, special characters comprising dollar signs, asterisks, and decimal points, and control tokens comprising at least an end-of-sequence token.

In some embodiments, the method is performed on a user mobile device, where the input image is captured by a camera of the user mobile device. In other embodiments, the method is performed on a remote server, where the input image is received from a user mobile device via a network connection.

In some embodiments, the method further comprises comparing the recognized text representation of the amount to a courtesy amount or legal amount indicated in the input image and, based on the comparison, determining whether to accept or reject a deposit transaction associated with the input image.

In some embodiments, the transformer-based optical character recognition model comprises a vision transformer encoder configured to process the input image and generate the encoded visual features, and an autoregressive decoder configured to generate the output values at each decoding step based on the encoded visual features and previously decoded tokens.

In some embodiments, the normalized confidence scores at each decoding step sum to one across the entire vocabulary.

In some embodiments, maintaining the plurality of candidate output sequences comprises retaining a candidate output sequence that includes a lower normalized confidence score value at a first decoding step when one or more subsequent tokens in that candidate output sequence have higher normalized confidence scores that result in a higher cumulative confidence score for that candidate output sequence compared to other candidate output sequences.

In some embodiments, a system is provided for optical character recognition of imagery. The system comprises a processor and a non-transitory computer-readable memory storing instructions that, when executed by the processor, cause the system to perform the operations described above, including maintaining the plurality of candidate output sequences by pruning lower-scoring candidate output sequences at each decoding step based on average logit scores and then reranking the retained sequences based on the average cumulative probability of confidence scores.

In some embodiments, a non-transitory computer-readable storage medium is provided that stores instructions which, when executed by a processor, cause the processor to perform beam search decoding operations. The beam search decoding comprises initializing a plurality of beams, where each beam represents a candidate output sequence. At each decoding step, for each beam, output values comprising raw logit scores are generated for tokens in a vocabulary of possible next tokens. Each beam is expanded based on the raw logit scores by selecting and appending possible next tokens according to the raw logit scores to create expanded candidate output sequences. For each expanded candidate output sequence, a cumulative confidence score is calculated by averaging the logit scores across all tokens in that expanded candidate output sequence. The expanded candidate output sequences effectively prune unwanted sequences below the top beam width parameter number of top scoring sequences based on average cumulative logit scores. The beam search decoding continues until an end-of-sequence token is generated or a maximum sequence length is reached. After all sequences have been generated, the fixed sequences are then normalized based on the softmax function across the vocabulary of output tokens and then reranked based on the average cumulative probability of the confidence scores. A final output sequence having a maximum average cumulative confidence score is selected from among the beams and output as a recognized textual representation of the amount for use in remote processing.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the drawings, wherein like numerals denote like elements.

FIG. 5 illustrates a mathematical formulation of the confidence-based beam search scoring function according to an embodiment of the present disclosure.

DETAILED DESCRIPTION

Figure 1:
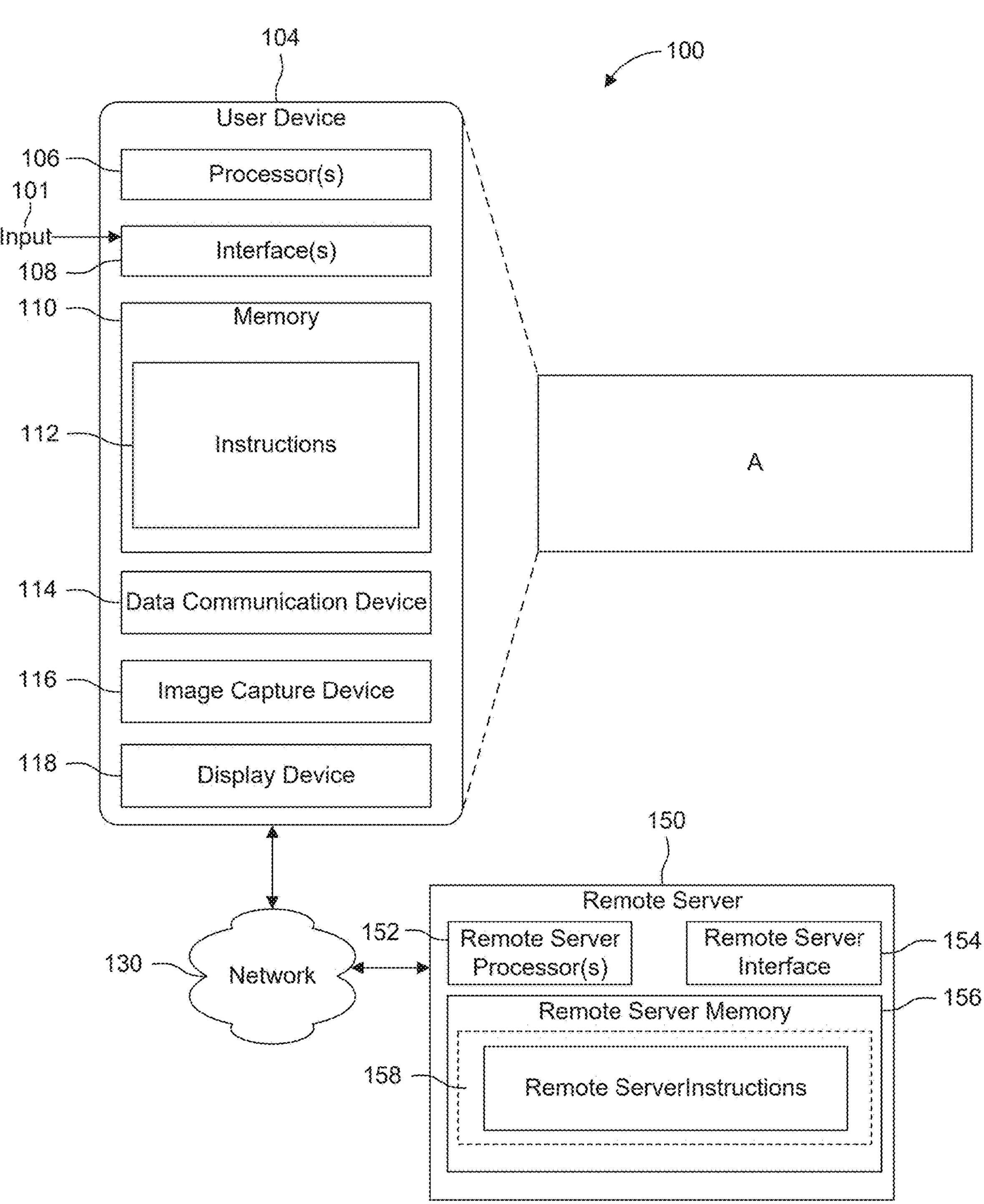
FIG. 1 illustrates a system architecture for using optical character recognition techniques according to an embodiment of the present disclosure.
Figure 1:
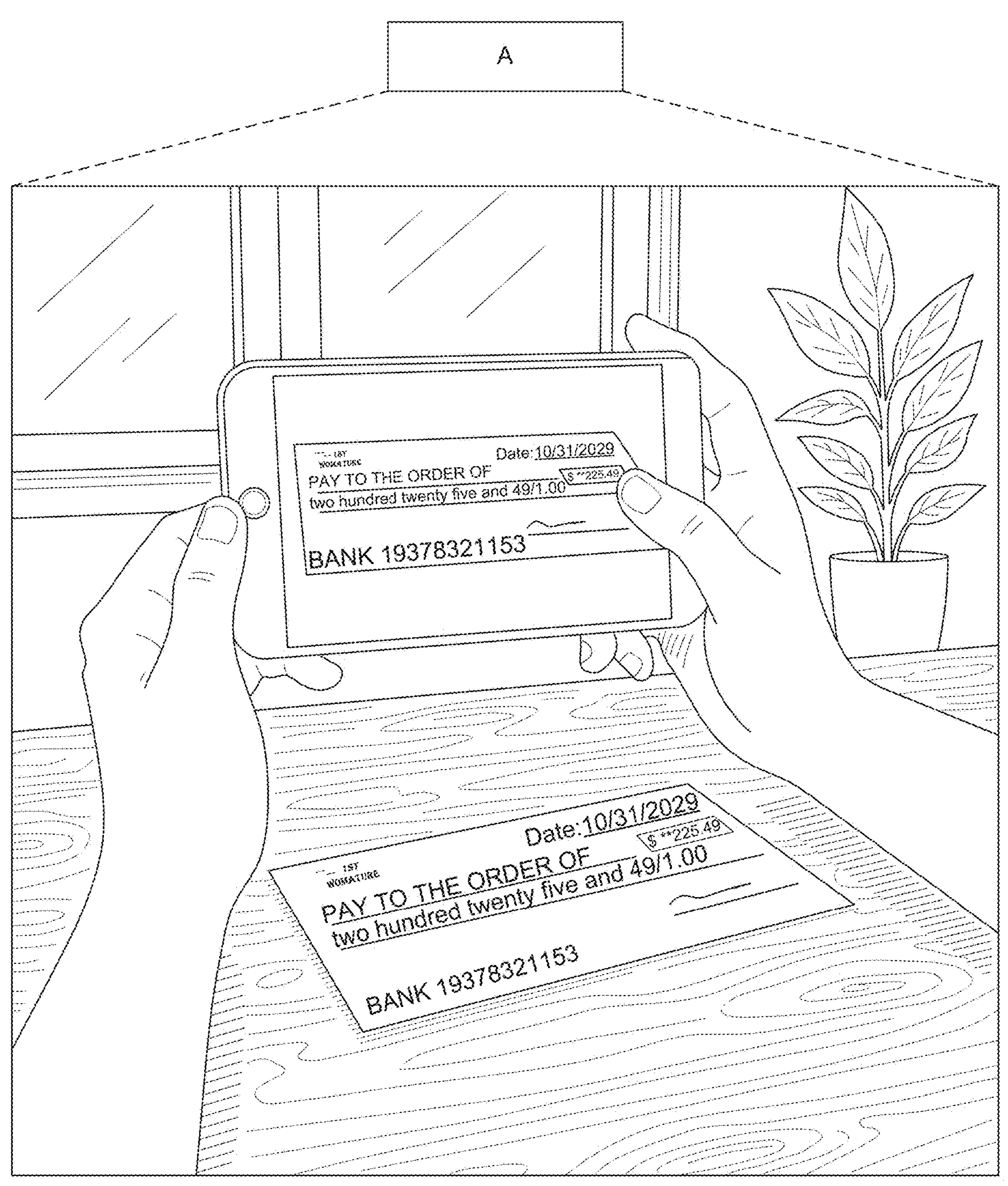

Generally, the present disclosure relates to optical character recognition (OCR) systems and methods for extracting text regions from documents (e.g., checks in mobile deposit applications), but a person of skill in the art will recognize how aspects described herein can be applied to other contexts. The user device can be any computing device capable of running an application implementing (in whole or in part) the optical character recognition techniques described herein. An image capture device, such as a camera, on the user device is configured to be activated at particular stages in the OCR process to capture image(s) of a document to process. For simplicity, an image of a document is referred to herein as a "document image" (or "check image" where the document is a check).

More specifically, the disclosed systems and methods employ a transformer-based OCR model (TrOCR) in conjunction with an enhanced beam search decoding process that converts model logits to confidence score and evaluates candidate sequences based on average confidence score across the entire decoded sequence, rather than using conventional greedy search approaches that select the highest probability character at each decoding step. This approach is particularly advantageous for reading printed amounts from checks, which often contain challenging character combinations such as dollar signs, asterisks, and variable spacing that can cause confidence degradation in traditional argmax decoding methods. The beam search approach maintains multiple candidate decoding paths and selects the sequence with the highest average confidence score, thereby improving accuracy in extracting monetary amounts from check images in mobile deposit applications. As used herein, the terms "token" and "character" are used interchangeably to refer to discrete units of output generated by the decoder during the sequence generation process. A token (or character) may represent a single alphanumeric character, a digit, a symbol, a punctuation mark, or any other discrete element in the output sequence. The decoder generates a sequence of tokens by predicting one token at a time based on previously generated tokens and encoded image features.

Although disclosed embodiments may be discussed in the context of mobile deposit applications, the claimed inventions are not directed to fundamental economic practices unless explicitly stated. Rather, mobile check deposit processes present an extremely challenging environment in which to perform optical character recognition. These challenges arise largely from difficulties in (1) running on consumer mobile devices and (2) processing checks.

Regarding the difficulties in running on consumer mobile devices, it is difficult to fine-tune or otherwise configure traditional OCR techniques to operate efficiently on a mobile device. Mobile devices often have limited battery capacity and have limited local storage space. The use of traditional OCR techniques can result in unwanted excess battery consumption and excess local storage consumption. Further, many mobile devices operate using cellular data connections, which presents challenges in updating applications and models on the device. Even if a mobile device had significant storage capacity, bandwidth constraints could limit the ability to download or update the application running the OCR model or the model itself. In addition, unwanted bandwidth consumption and delays can arise from sending the images off device for remote processing. Further still, given the widespread demand for mobile check deposit, and the diversity of devices with which people desire to use mobile check deposit, difficulties arise in ensuring compatibility of the techniques across disparate devices. The images taken of checks for mobile check deposit often lack the quality and consistency of those produced by document scanners or digitally produced documents. These issues can further complicate OCR processing.

Regarding difficulties associated with checks, many checks involve fonts that cannot be extracted accurately using traditional OCR processes. Accordingly, recognizing and extracting text, such as from a check image containing such fonts, using traditional OCR processes can present challenges that may result in extracting inaccurate data, such as an invalid routing number. Inaccurate extraction of data in the financial context can have extreme implications, including resulting in needless additional processing and inaccurate denials, among other issues. Further still, checks can be difficult to process by having complicated background images, a mix of handwritten and typed information, damage (water damage, creases, tears, smears, smudges, or other damage), and occasionally fraudulent modifications.

Thus performing optical character recognition on check images is particularly technically challenging, which can require advanced technical solutions to mitigate.

Example Environment

FIG. 1 illustrates a diagram of a system architecture for optical character recognition using a mobile device in which systems and methods of the present disclosure can operate. FIG. 1 (Continued), designated "A", illustrates a remote check capture scenario. In some embodiments, user U has a document 102 to process at least partially remotely using a user device 104. The user device 104 is a device used by a user that can be used as part of processes described herein. The user device 104 can include one or more aspects described elsewhere herein such as in reference to the computing environment 700 of FIG. 7.

In many examples, the user device 104 is a personal computing device, such as a smart phone, tablet, laptop computer, or desktop computer. But the user device 104 need not be so limited and may instead encompass other devices used by a user as part of processes described herein. In the illustrated example, the user device 104 can include a user device processor set 106, a user device interface set 108, and a user device memory set 110, among other components.

The user device processor set 106 is a set of one or more processors. One or more processors are components of the user device 104 that execute instructions, such as instructions that obtain data, process the data, and provide output based on the processing. The user device processor set 106 can include one or more aspects described below in relation to the processor set 712 of FIG. 7.

The user device interface set 108 is a set of one or more interfaces, which are one or more components of the user device 104 that facilitate receiving input from and providing output to something external to the user device 104. The user device interface set 108 can include one or more aspects described below in relation to the interface set 718 of FIG. 7.

The user device memory set 110 is a set of one or more memory components, which are components of the user device 104 configured to store instructions and data for later retrieval and use. The user device memory set 110 can include one or more aspects described below in relation to the memory 714 of FIG. 7. As illustrated, the user device memory set 110 stores user device instructions 112.

The user device instructions 112 are a set of instructions that, when executed by the user device processor set 106, cause the device processor set 106 to perform an operation described herein. In examples, the instructions 112 can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface set 108 can further provide output to the user.

Aspects of the processes described herein (e.g., enhanced beam search decoding for transformer-based OCR with confidence-based reranking) can be performed locally at the mobile device 104 via the instructions 112, and aspects of the processes described herein are performed at the remote server 150. In some embodiments, the instructions 112 executed on the mobile device 104 is in communication with the remote server 150 over network 130 throughout the remote check deposit process. In some embodiments, the mobile application executed on the mobile device 104 is in communication with the remote server 150 over network 130 at certain stages of a remote process. While the user device 104, network 130, and remote server 150 are briefly described in this section, in addition or instead they may also include aspects described below in relation to the computing system of FIG. 7.

A user input device 106 of mobile device 104 operates to receive a user input from a user for controlling the mobile device 104. The user input can include a manual input and/or a voice input. In some embodiments, the user input device 106 includes one or more buttons, keys, touch levers, switches, and/or other mechanical input devices for receiving the input 101. The user input device 106 can include a touch screen or a gesture input device. In some embodiments, the user input device 106 can detect sounds including the voice input such as a voice of a user (e.g., an utterance) for controlling aspects of a remote check deposit process via the mobile device 104.

In some embodiments, a display device 118 is provided that operates to display a graphical user interface that displays information for interacting with the mobile device 104. Examples of such information include check data information, notifications, and other information. In some embodiments, the display device 118 is configured as a touch sensitive display and includes a user input device for receiving the input 101 from a selector (e.g., a finger, stylus etc.) controlled by the user U. In some embodiments, therefore, the display device 118 operates as both a display device and a user input device.

The data communication device 114 operates to enable the mobile device 104 to communicate with one or more computing devices over one or more networks, such as the network 130. For example, the data communication device 114 is configured to communicate with the remote server 150 and receive notifications from the remote server 150 at least partially via the network 130. The data communication device 114 can be a network interface of various types which connects the mobile device 104 to the network 130.

The image capture device 116, in some embodiments, is one or more cameras integrated with the mobile device 104. The image capture device 116 is configured to capture an image or images of the document 102. In some embodiments, when the image capture device is activated, user actuation is required to capture the check image rather than permitting automatic image capture techniques that capture an image automatically without requiring any manually input by the user U. Check images captured by the image capture device 116 are stored in the device memory set 110 and received by the instructions 112 (e.g., an application) executed on the mobile device 104 for remote deposit of the document 102.

The device memory set 110 typically includes at least some form of non-transitory computer-readable media. Non-transitory computer-readable media includes any available media that can be accessed by the mobile device 104, such as volatile and nonvolatile, removable and non-removable media implemented in any device configured to store information such as computer readable instructions, data structures, program modules, or other data.

User device memory set 110 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the mobile device 104 in a non-transitory manner.

The user device memory set 110 operates to store data and instructions. In some embodiments, the user device memory set 110 stores instructions for a mobile application. In some embodiments, the mobile application is a mobile banking application hosted by a financial institution. In some examples, one or more methods described herein can be implemented as instructions stored in one or more memory devices on one or more computers that, when executed by one or more processors, cause the processors to perform one or more operations described herein.

In some examples, as described herein, network 130 includes a computer network, an enterprise intranet, the Internet, a LAN, a Wide Area Network (WAN), wireless transmission mediums, wired transmission mediums, other networks, and combinations thereof. Although network 130 is shown as a single network in FIG. 1, this is shown as an example and the various communications described herein can occur over the same network or a number of different networks. The network 130 is a set of devices that facilitate communication from a sender to a destination, such as by implementing communication protocols. Example networks 130 include local area networks, wide area networks, intranets, or the Internet.

Figure 2:
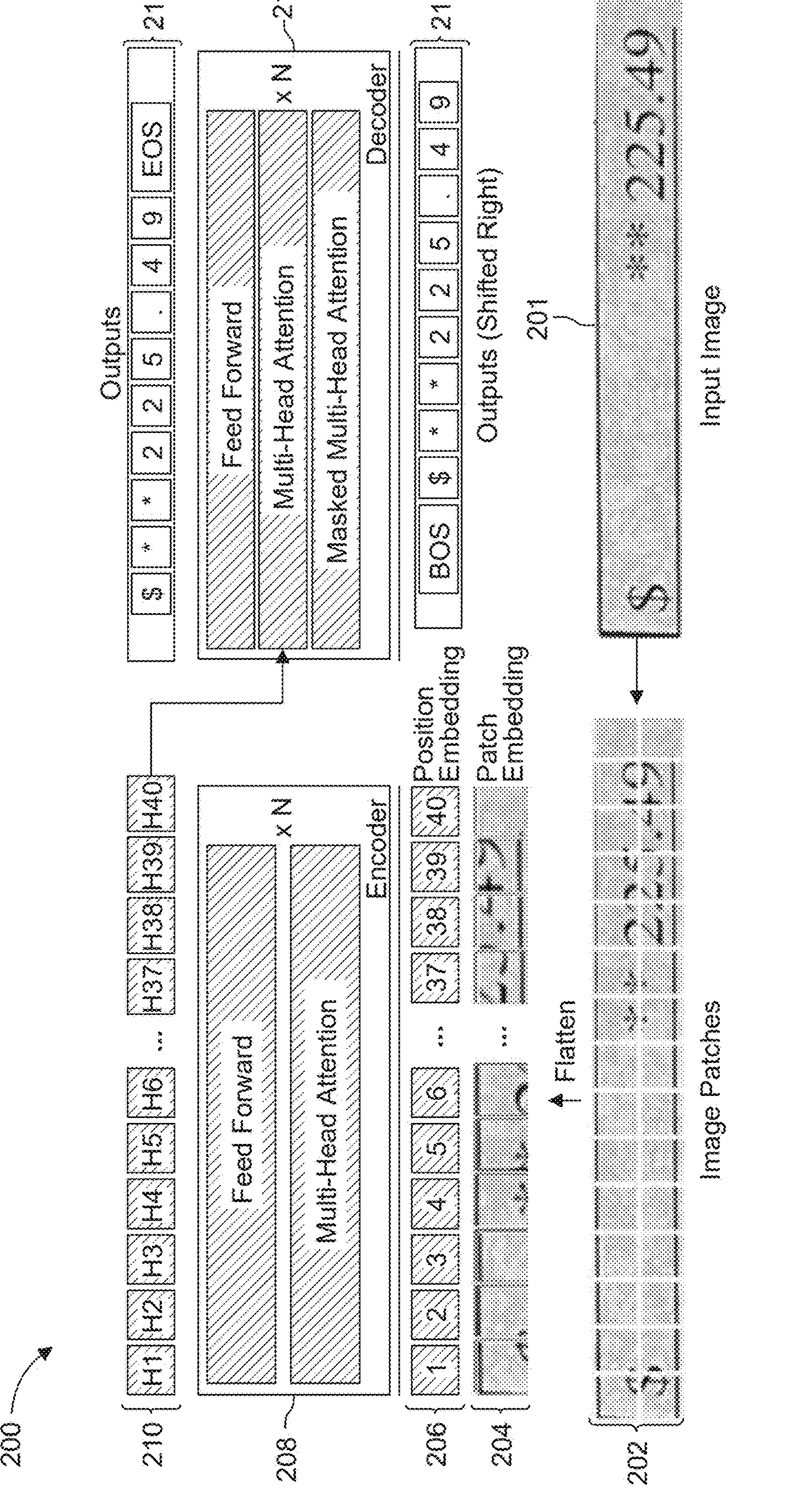
FIG. 2 illustrates a transformer-based encoder-decoder architecture for optical character recognition according to an embodiment of the present disclosure.

FIG. 2 also illustrates an example user interface of a remote check deposit system for capturing a check image. A display device 118 of user device 104 operates to display the user interface. One or more image capture devices operating on mobile device 104 capture one or more images of a document 102 for remote deposit.

The user device 104 is a device used by a user that can be used as part of processes described herein. The user device 104 can include one or more aspects described elsewhere herein such as in reference to the computing environment 700 of FIG. 7. In many examples, the user device 104 is a personal computing device, such as a smart phone, tablet, laptop computer, or desktop computer. But the device 104 need not be so limited and may instead encompass other devices used by a user as part of processes described herein. In the illustrated example, the user device 104 can include a user device processor set 106, a user device interface set 108, and a user device memory set 110, among other components.

The user device processor set 106 is a set of one or more processors. One or more processors are components of the user device 104 that execute instructions, such as instructions that obtain data, process the data, and provide output based on the processing. The user device processor set 106 can include one or more aspects described below in relation to the processor set 712 of FIG. 7.

The user device interface set 108 is a set of one or more interfaces, which are one or more components of the user device 104 that facilitate receiving input from and providing output to something external to the user device 104. The user device interface set 108 can include one or more aspects described below in relation to the interface set 718 of FIG. 7.

The user device memory set 110 is a set of one or more memory components, which are components of the user device 104 configured to store instructions and data for later retrieval and use. The user device memory set 106 can include one or more aspects described below in relation to the memory 714 of FIG. 7. As illustrated, the user device memory set 110 stores user device instructions 108.

The user device instructions 108 are a set of instructions that, when executed by the user device processor set 106, cause the device processor set 106 to perform an operation described herein. In examples, the instructions 112 can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface can further provide output to the user. In some examples, the client instructions 108 are instructions that cause a web browser of the user device 104 to render a web page associated with a process described herein. The web page may present information to the user and be configured to receive input from the user and take actions in response thereto.

The remote server 150 is a server device that functions as part of one or more processes described herein. In the illustrated example, the remote server 150 includes a remote server processor set 152, a remote server interface set 154, and a remote server memory set 156, among other components.

The remote server processor set 152 is a set of one or more processors that are components of the remote server 150 that execute instructions, such as instructions that obtain data, process the data, and provide output based on the processing. The server processor set 152 can include one or more aspects described below in relation to the processor set 712 of FIG. 7.

The remote server interface set 154 is a set of one or more components of the remote server 150 that facilitate receiving input from and providing output to something external to the remote server 150. The remote server interface set 154 can include one or more aspects described below in relation to the one or more interfaces 718 of FIG. 7.

The remote server memory set 156 is a collection of one or more components of the remote server 150 configured to store instructions and data for later retrieval and use. The remote server memory set 156 can include one or more aspects described below in relation to the memory 714 of FIG. 7. The remote server memory 156 can store remote server instructions 158.

The remote server instructions 158 are instructions that, when executed by one or more processors of the remote server processor set 152, cause the remote server processor set 152 to perform one or more operations described elsewhere herein.

The network 130 is a set of devices that facilitate communication from a sender to a destination, such as by implementing communication protocols. Example networks 130 include local area networks, wide area networks, intranets, or the Internet.

As discussed above, conventional OCR systems face significant challenges when processing check amounts, particularly those containing special formatting characters commonly found in printed checks. Traditional argmax or greedy decoding approaches in OCR systems often struggle with character sequences that include dollar signs, asterisks used as fill characters, and irregular spacing, as these elements can cause confidence degradation in the decoding process. When conventional OCR systems encounter low-confidence predictions early in a sequence-such as when processing asterisk fill characters or dollar signs—the greedy decoding approach may select suboptimal characters at each step, leading to cascading errors throughout the remainder of the sequence. This is particularly problematic for check amount reading applications where accuracy is critical for financial processing.

The beam search decoding approach described herein addresses these limitations by maintaining multiple candidate sequences during the decoding process and evaluating sequences based on average confidence score rather than making locally optimal character-by-character decisions. This approach is especially advantageous when processing check amounts that contain the challenging character combinations commonly found in printed financial documents.

In some embodiments, a process for mobile check deposits, referred to as Mobile Check Deposit (MCD), is provided to extract information from check images. The process begins with object detection, which identifies the relevant items on the check by creating bounding boxes around them. Once the items are located, Optical Character Recognition (OCR) is used to read an amount field. A transformer-based model called Transformer OCR (TrOCR) is used to encode the snippet within the encoder and decode the text step by step, predicting letters, characters, and numbers. In an example implementation, the OCR operates on a line-by-line basis, aligning with the object detection process that systematically locates the amount box text line on the check.

FIG. 2 illustrates a transformer-based optical character recognition (OCR) architecture implementing the enhanced beam search decoding methodology described herein. The figure depicts a processing pipeline from input image to textual output, showing how an input check image is processed through encoder and decoder components to generate a recognized text sequence.

The process begins with input image 201, which in this example depicts a check amount "$225.49". Input image 201 is divided into a sequence of image patches 202**, where the image is decomposed into smaller rectangular sections that serve as atomic processing units for the transformer encoder. Each patch captures a local region of the image, maintaining spatial structure while allowing sequential token-like processing of the image simultaneously.

The image patches 202 are flattened and converted into vector representations through patch embedding 204. Patch embedding 204 transforms each image patch into a fixed-dimensional embedding suitable for transformer processing, enabling the visual content to be handled as a sequence of tokens.

Position embedding 206 adds spatial positional information to each patch embedding, preserving the spatial relationships between different portions of the original image. Position embedding 206 ensures that the transformer encoder 208 can understand the relative positions of image patches, which is used for maintaining the spatial context of the textual content within the image.

The encoder portion of the architecture includes multi-head attention, which processes the sequence of position-embedded patch representations. Multi-head attention of encoder 208 enables the model to focus on different aspects of the visual input simultaneously, allowing for comprehensive feature extraction across the entire image sequence. The encoder processes the visual information and generates encoded representations that capture both local and global visual features of the input text image.

The architecture employs a transformer-based encoder-decoder configuration in which a pre-trained image transformer serves as the encoder and a pre-trained text transformer serves as the decoder.

The decoder 214 generates output tokens 210 representing the recognized text sequence. As illustrated, the sequence includes a beginning-of-sequence (BOS) token, the generated text tokens "$225.49", and an end-of-sequence (EOS) token, showing how the decoder 214** produces text autoregressively-one token at a time.

Within the decoder 214, feed-forward layers transform the attention outputs 212 into logits, which are unnormalized scores representing the model's relative confidence for each token in the vocabulary. These logits are subsequently passed through a normalization function (e.g., softmax) to produce normalized confidence scores, which form the input to the beam search decoding process described herein. As used herein, the terms "logits," "raw logits," "logit scores," and "logit outputs" are used interchangeably to refer to these unnormalized decoder outputs.

Masked multi-head attention in the decoder 214 ensures that during training and inference, each position in the output sequence can attend to previous positions, maintaining the autoregressive nature of the text generation process. Masked multi-head attention of the decoder 214 prevents the model from accessing future tokens during the sequential decoding process, ensuring proper causal dependency in the generated text sequence.

Outputs (shifted right) 216 represents the training configuration in which the ground-truth token sequence is offset by one position and provided to the decoder (teacher forcing). During training this enables the decoder to learn the correct next-token prediction at every timestep; at inference the model instead operates autoregressively, producing one token at a time conditioned on previously generated tokens and the encoded image features.

In some embodiments, an optical character recognition (OCR) system is provided that employs a pre-trained transformer-based model to transcribe text from images. The model architecture includes a transformer-based encoder and a transformer-based decoder, both of which may be initialized using pre-trained models.

Encoder Architecture

In certain embodiments, the encoder 208 is configured to receive an input image, such as a cropped textline or document region, and to resize the image to a predetermined resolution (for example, 384×384 pixels). The resized image may then be decomposed into a sequence of smaller image patches, each patch representing an atomic unit of visual information. In some implementations, the image is divided into 16×16 pixel patches. Each patch may be flattened and linearly projected into a vector of fixed dimensionality to generate patch embeddings that serve as input tokens to the transformer encoder.

A positional embedding may be added to each patch embedding to preserve spatial relationships among the patches. The encoder may include multiple layers of self-attention mechanisms to process the sequence of patch embeddings and generate a set of latent vectors representing the visual content of the image. In some embodiments, the encoder output is aggregated into a single feature vector representing the entire image, while in other embodiments, it is maintained as a sequence of token embeddings for subsequent processing by the decoder.

Decoder Architecture

In some embodiments, the decoder 214 comprises a transformer-based language model that receives, as input, the encoded visual representations produced by the encoder and generates a corresponding sequence of textual tokens. The decoder operates in an autoregressive manner, wherein at each decoding step it takes as input one or more previously generated tokens together with the encoder output, and generates raw logit scores over a vocabulary of potential next tokens. These raw logit scores represent unnormalized predictions that are subsequently converted to a probability distribution through application of a normalization function (such as softmax). The decoder may include self-attention layers and encoder-decoder attention layers that allow the decoder to condition its predictions on the encoded visual features.

Decoding Process and Confidence-Based Beam Search

In some embodiments, the system employs a beam search decoding strategy that operates on normalized confidence scores rather than on raw logits. At each decoding step, the decoder produces a vector of logits (also referred to as a set of logits) representing its unnormalized confidence for each token in the vocabulary. These logits are passed through a normalization function, such as a softmax, to produce a probability distribution across all possible tokens. The resulting normalized confidence scores, which sum to one across the vocabulary, form the inputs to the beam search process. Each entry in this vector represents the model's estimated probability for a specific character or subword token.

The beam search maintains a set of top-s candidate sequences (for example, s=5). At each decoding iteration, every active sequence in the beam is expanded by appending one additional token based on logit scores. The decoder generates raw logit scores for possible next tokens, and the beam search initially selects the N most probable partial sequences according to their cumulative logit scores, where N is an integer. After the candidate sequences are generated using logit-based selection, these sequences are reranked using normalized confidence scores computed by applying a softmax function to the logits. This reranking process enables the system to select the sequence with the highest average confidence score as the final recognized text output.

This process continues until all candidate sequences terminate with an end-of-sequence token.

The sequence generation and reranking processes are distinct operations. During generation, the decoder produces sequences autoregressively based on logit values, with token selection at each step determined by logit scores. The normalized confidence scores are computed after sequence generation and applied during a reranking phase that evaluates the already-generated candidate sequences. The logit-based generation phase creates candidate paths through the vocabulary space, while the confidence-based reranking phase selects the optimal sequence from among those candidates. During the first loop (logit-based generation), only raw logit scores are used for token selection and pruning. After each decoding step completes and pruning retains the top-s sequences, the second loop (confidence-based reranking) converts the raw logits to normalized confidence scores using softmax, calculates average confidence scores for each retained sequence, and reranks the sequences accordingly before proceeding to the next decoding step.

This approach differs from conventional argmax decoding, which greedily selects the most probable token at each step without regard to overall sequence confidence. By converting logits to confidence score and evaluating confidence scores across an entire sequence, the disclosed system provides a more robust decoding process that improves recognition accuracy and stability, particularly in cases involving ambiguous, low-quality, or degraded text imagery.

In some embodiments, the final output sequence selected based on maximum average confidence score may differ from the candidate output sequence that would be selected based on average logit scores. Because the softmax normalization redistributes probability mass across the vocabulary and averaging favors sequences with consistent confidence across all tokens, a sequence with lower individual logit values but more uniform confidence may achieve a higher average confidence score than a sequence with higher peak logits but variable confidence. This re-ranking based on normalized, averaged confidence score enables upscoring of correct sequences that would be potentially lower in overall score determined by logit-based scoring.

Model Initialization

In some embodiments, the encoder is initialized using a pre-trained Vision Transformer (ViT) model or a variant thereof, such as BEIT or DeiT, trained on large-scale image datasets. The decoder may be initialized using a pre-trained language model, such as ROBERTa or MiniLM, adapted for autoregressive text generation. Model parameters not represented in the pre-trained source models, including those associated with encoder-decoder attention, may be initialized randomly. This hybrid initialization allows the system to leverage prior visual and linguistic knowledge, thereby improving convergence speed and recognition accuracy.

Training and Fine-Tuning

In some embodiments, the OCR system is trained or fine-tuned using image-text pairs that may be synthetically generated or obtained from human-labeled data. During training, a ground-truth text sequence is shifted by one position and supplied to the decoder as input, while the decoder is trained to predict the next token at each step using a cross-entropy loss function. The use of pre-trained encoder and decoder weights enables faster convergence and improved recognition accuracy across printed, handwritten, and scene text recognition tasks.

The embodiments described herein provide an end-to-end OCR solution that does not rely on convolutional neural networks (CNNs) or external language models. The transformer-based architecture effectively models both the spatial structure of the input image and the linguistic dependencies of the generated text sequence. By applying beam search decoding based on normalized confidence scores rather than raw logits, the system identifies the most probable overall text sequence rather than the most probable individual tokens. This results in improved accuracy, robustness, and stability, particularly in low-quality or ambiguous text recognition scenarios.

Beam Search Decoding Process

Figure 3:
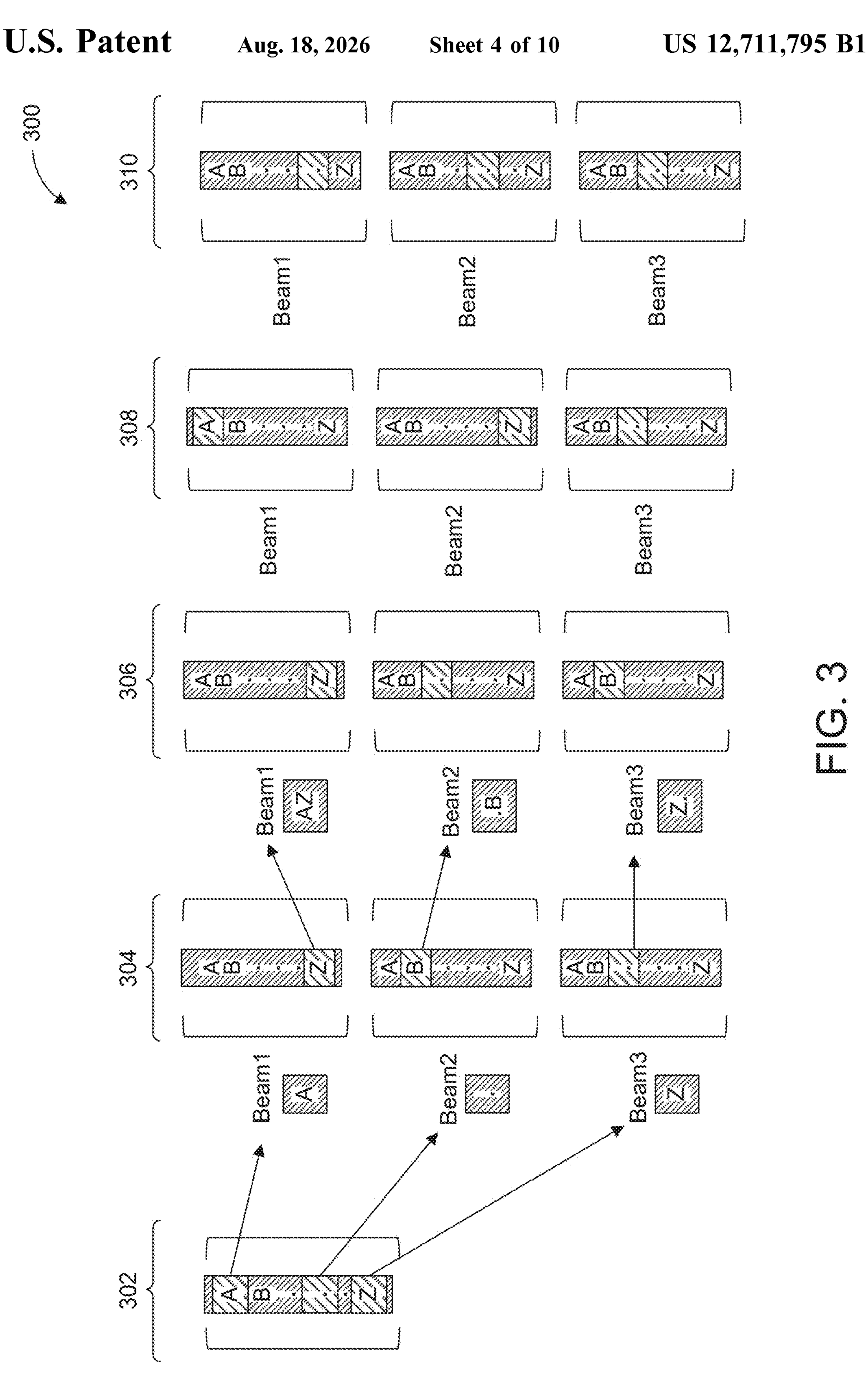
FIG. 3 illustrates a beam search decoding process across multiple sequential decoding steps according to an embodiment of the present disclosure.

FIG. 3 illustrates an enhanced beam search decoding process 300 executed by the system across multiple sequential decoding operations to determine a final recognized text sequence having the highest overall confidence score. The process maintains and evaluates multiple candidate decoding sequences (also referred to as "beams") in parallel, allowing the system to explore and refine alternative interpretations of ambiguous visual input such as check-amount imagery.

In operation 302, the process begins when a decoder module generates raw logit scores over a vocabulary of possible output tokens for an initial decoding position. The decoder output comprises unnormalized logit values. Based on these logit scores, the system selects a predetermined number of top-ranked tokens-such as the three tokens having the highest logit scores-to generate an initial set of beam sequences. After the initial candidate sequences are generated based on logits, the raw logit scores are converted into normalized confidence scores (for example, by applying a softmax function) for subsequent use in reranking operations. In the illustrative embodiment, the top three beams based on logits correspond to representative tokens "A", ".", and "Z". Each letter or symbol serves merely as an example of a vocabulary token that could represent any character, numeral, or symbol that the OCR model might predict when processing a check image, including characters such as "$," "*," "2," or "." These initial beams therefore define three independent decoding hypotheses:

Beam 1: "A"
Beam 2: "."
Beam 3: "Z"

In operation 304, the decoder expands each beam independently by generating raw logit scores for the next token conditioned on the sequence of tokens already present in that beam. Based on the logit scores, the system selects top-ranked tokens to branch each beam into multiple extended candidate sequences. For instance, beam 1 ("A") generates candidate extensions "AA," "AB," and "AZ" based on selecting tokens with highest logit scores; beam 2 (".") generates ".A," ".B," and ".Z" based on logit scores; and beam 3 ("Z") generates "ZA," "ZB," and "ZZ" based on logit scores. After these sequences are generated using logit-based selection, the raw logit scores are converted to normalized confidence scores by applying a softmax function. Each extended sequence is then assigned a cumulative confidence score computed from the normalized confidence values. The confidence scores are computed after sequence generation and used for reranking the generated sequences in subsequent operations.

In operation 306, the system continues to expand and evaluate the partial sequences produced in operation 304, maintaining for each beam a running confidence measure that reflects all tokens predicted to that point. For example, a sequence such as ".BZ" represents a prediction in which a period was decoded first, followed by "B" and then "Z." Such a sequence demonstrates how the beam search process simultaneously preserves multiple possible interpretations of ambiguous visual features-decimal points, asterisks used as fill characters, inter-digit spacing, and the like-that commonly appear in check-amount regions. As additional tokens are predicted, each candidate sequence accumulates a cumulative confidence score quantifying its overall likelihood across the decoding steps completed so far.

In operation 308, the system ranks all active candidate sequences according to their average confidence score (rather than raw logits) and updates each beam's confidence by incorporating the confidence score of its most recently predicted token. Characters such as lowercase "z" and uppercase "Z" represent distinct vocabulary tokens that may receive different confidence scores depending on the detected visual characteristics in the input image—for example, a smaller apparent height may yield higher confidence score for the lowercase form. At each decoding step, the system prunes to retain a fixed number of top-performing beams (for example, s=3) based on average logit scores. The retained beams are then reranked according to their average confidence scores, which may result in a different ordering than the logit-based selection. In the illustrated example, surviving beams may include ".B", "AA", and "ZA", which remain candidates for further expansion.

In operation 310, decoding proceeds until an end-of-sequence (EOS) condition is met. The remaining beams are then ranked according to their average confidence score across the complete sequence, and the beam exhibiting the highest overall average confidence score is designated as the final recognized text output. The process thereby converges on the sequence most consistent with the visual evidence while avoiding premature commitment to any single early hypothesis.

The sequence of operations shown in FIG. 3 highlights the advantages of confidence-based beam search decoding over conventional greedy or argmax decoding. By converting logits into normalized confidence score and evaluating cumulative confidence score across an entire predicted sequence, the disclosed method achieves more robust and accurate recognition of check-amount text containing ambiguous characters such as dollar signs, asterisks, decimal points, numerals, and irregular spacing. Even beams that begin with lower-probability tokens-such as the initial punctuation beam "."—may evolve into the most confident final result, demonstrating the effectiveness of maintaining multiple candidate sequences during decoding.

Figure 4:
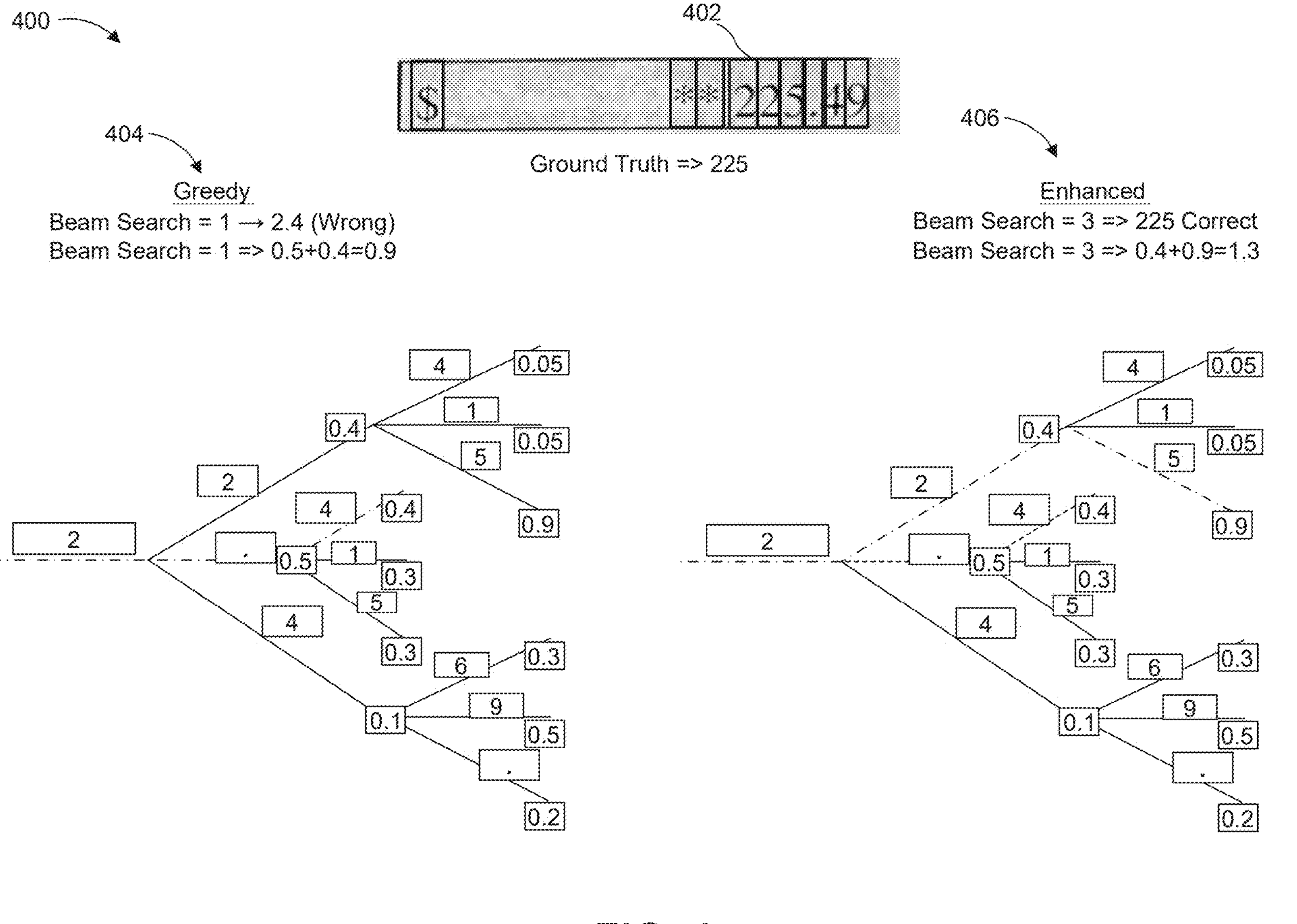
FIG. 4 illustrates a comparative analysis of greedy decoding and beam search decoding approaches, showing confidence score and cumulative scoring for candidate sequences according to an embodiment of the present disclosure.

FIG. 4 illustrates a comparative analysis between greedy decoding and beam search decoding with different beam width parameters, showing the technical advantages of maintaining multiple candidate sequences when decoding optical character recognition (OCR) outputs for check amount imagery. In particular, FIG. 4 illustrates propagation of confidence values through a decoding tree and selection of a final sequence based on cumulative scoring across tokens rather than step-wise selection.

FIG. 4 depicts an example decoding process for a portion of a check amount string containing the sequence "225" as part of the full string "$**225.49." The figure compares greedy decoding (Beam Search=1) with beam search decoding (Beam Search=3). Greedy decoding selects a single token at each decoding step, whereas beam search maintains multiple candidate output sequences concurrently.

At the decoding step shown, prior characters have already been processed. The decoder generates raw logit values for a set of candidate tokens at the next position and converts the logit values to normalized confidence scores using a softmax operation. In the illustrated example, three candidate tokens are generated: "2" (0.4), "." (0.5), and "4" (0.1). Token selection for beam expansion is performed based on logit values, while confidence scores are used for cumulative sequence scoring and reranking.

In greedy decoding, the system selects the highest-confidence token at each step and conditions all subsequent predictions on that single selection. In the illustrated example, token "." is selected based on its higher confidence score. At the following decoding step, the model generates new candidate tokens conditioned on the selected "." token, including "4" (0.4), "1" (0.3), and "5" (0.3), from which "4" is selected. The resulting partial output "0.4" is incorrect relative to the ground truth sequence "25" for this portion of the amount string.

This illustrates a limitation inherent in greedy decoding: locally optimal selections based solely on single-step confidence can result in globally incorrect sequences, particularly where earlier characters are visually ambiguous or where subsequent characters provide stronger discriminating evidence.

In contrast, beam search decoding retains multiple candidate sequences at each step. At the illustrated decoding step, the system retains the three highest-ranking tokens as parallel beams: "2," ".", and "4." Each retained candidate sequence is independently expanded at the next step.

As shown, the beam beginning with "2" generates candidates including "5" with high confidence, resulting in a cumulative confidence of 1.3 for the "25" sequence. By comparison, the greedy path produces a cumulative confidence of 0.9 for "0.4." The beam search system selects the sequence with the highest cumulative confidence across tokens, thereby identifying the correct output even when an early decoding decision had lower individual confidence.

At each decoding step, the system ranks beams based on average logit scores, retains a beam width number of top-ranking sequences, and discards lower-ranking sequences. The retained beams are reranked based on cumulative confidence scores computed from normalized probabilities. This pruning prevents exponential growth while preserving alternative hypotheses.

In some embodiments, a cumulative confidence score is calculated by averaging the normalized confidence scores across all tokens of that candidate output sequence. In some embodiments, cumulative confidence scores may be calculated using techniques other than averaging. By way of example and not limitation, the cumulative confidence score may be determined using a median score, a percentile-based score (e.g., a 20th-percentile score), a ranked score, or any other suitable statistical aggregation. In certain embodiments, different aggregation techniques may be applied selectively, such as using a median score only for numeric tokens (e.g., digits 0-9 and decimal values).

In some embodiments, expansion includes selecting a top-K subset of tokens from the logits for each beam. Each retained beam is expanded using the selected tokens, after which the expanded set is pruned to a configured beam width. Logit-based scoring and confidence-based scoring may be used jointly or independently for pruning and reranking.

In the example of FIG. 4, greedy decoding produces output "2.4" with cumulative confidence 0.9, while beam search decoding produces "225" with cumulative confidence 1.3, representing both an accuracy improvement and a higher confidence measure for the correct hypothesis.

The disclosed decoding approach is particularly advantageous for check amount recognition because check amounts frequently contain visually ambiguous characters such as dollar signs, asterisks, decimal points, and tight spacing between numerals. Such characters are commonly underrepresented in training corpora, leading to inconsistent confidence at individual decoding steps.

By maintaining multiple decoding hypotheses and selecting based on cumulative confidence, the system reduces sensitivity to isolated prediction errors and improves robustness in the presence of image noise, variable lighting, low resolution, or visually similar glyphs.

In some embodiments, normalized confidence scores are derived from logits using a softmax function and are summed across decoded tokens to generate a cumulative confidence metric. The cumulative confidence serves as a final scoring criterion for output sequence selection and improves cross-position comparability.

FIG. 4 further illustrates a pruning mechanism that enforces a fixed beam width after each decoding iteration, balancing computational efficiency against decoding accuracy. The beam width may be configurable and dynamically adjustable based on system constraints.

The example of FIG. 4 demonstrates that beam search decoding enables recovery from early ambiguous predictions and yields improved end-to-end recognition accuracy.

FIG. 5 illustrates the mathematical formulation underlying the confidence-based beam search decoding process, showing how candidate output sequences are scored and ranked to determine the optimal text recognition result. This figure presents a computational framework that enables the system to evaluate multiple candidate sequences simultaneously and select the sequence with the highest cumulative confidence score across all decoding steps.

The figure presents a scoring function that operates on a per-step basis during the sequential decoding process. The scoring function takes two primary inputs: a variable x representing the input image (specifically, the check image or other financial document being processed by the optical character recognition system), and a variable y representing a candidate output sequence comprising one or more predicted tokens. Each candidate sequence y constitutes a hypothesis about the correct textual interpretation of the check amount shown in the input image x.

At each decoding step t, the system evaluates a probability distribution representing the conditional probability of predicting a particular token at position t, given all previously predicted tokens in the sequence and conditioned on the input image. This probability distribution is obtained by applying softmax normalization to the raw logit scores generated by the decoder component of the transformer-based OCR model, which processes the encoder's visual feature representations along with the prior token predictions.

The scoring function shown in FIG. 5 incorporates a "top-s" selection mechanism at two levels of the decoding process. First, during sequence generation at each individual decoding step, the system generates raw logit scores for all vocabulary tokens and selects the s tokens with highest logit scores for expanding the candidate sequences, rather than considering all possible vocabulary tokens (which could number in the hundreds for a check amount recognition vocabulary including digits, special characters, and control tokens). After sequences are generated, the logit scores are converted to normalized confidence scores that are used for reranking. Second, across the complete decoding process, the system maintains the top s candidate sequences (beams), reranking them based on cumulative confidence scores. The variable "s" represents the beam width parameter, which in the example shown in FIG. 5 is set to a value of 5, meaning the system maintains the top five highest-scoring candidate sequences based on confidence score reranking at each decoding step and ultimately selects the single candidate sequence having the maximum cumulative confidence score as the final recognized output. Though the figure illustrates the specific case where s equals 5, this beam width parameter is configurable depending on the balance desired between recognition accuracy and computational cost. This top-s selection-logit-based selection during generation-provides computational efficiency while maintaining sufficient diversity among candidate sequences to explore alternative interpretations.

The cumulative score for a complete candidate sequence is computed by aggregating the probability values (converted to confidence scores) across all decoding steps from the initial token position through the final token position. This cumulative scoring approach contrasts with greedy decoding methods that make irrevocable decisions at each individual step without considering the global sequence likelihood.

The figure further specifies that the top beam is determined by selecting the maximum value from the top five candidate sequences. This notation indicates that after scoring all active candidate sequences at each decoding step, the system retains the top-ranked beams for continued expansion. The specification of "top five" suggests maintaining the five highest-scoring candidate sequences, though this beam width parameter is configurable depending on the balance desired between recognition accuracy and computational cost. The maximum operation ultimately selects the single candidate sequence having the maximum cumulative confidence score as the final recognized output when the decoding process completes.

This mathematical formulation shown in FIG. 5 provides the theoretical foundation for the visual beam search process illustrated in FIG. 4 and the comparative analysis shown in other beam search diagrams. By explicitly defining how candidate sequences are scored based on conditional probabilities across the entire decoded sequence, FIG. 5 demonstrates that the disclosed system evaluates global sequence confidence rather than making locally optimal character-by-character predictions.

The confidence-based scoring approach represented in this mathematical framework enables the system to achieve superior recognition accuracy for check amount imagery containing challenging elements such as dollar signs, asterisk fill characters, decimal points, and irregular spacing. The per-step probability evaluation captures contextual dependencies between adjacent characters, allowing the model to leverage sequential patterns (such as the typical structure of monetary amounts) to improve prediction confidence even when individual characters are visually ambiguous.

Implementation of this scoring function involves converting the raw logit outputs from the decoder's final linear layer into normalized probability values using a softmax activation function. These normalized probabilities, which sum to one across the vocabulary at each decoding step, serve as the confidence scores that are aggregated to compute cumulative sequence scores. This normalization ensures that confidence score are comparable across different decoding positions and different candidate sequences, enabling robust ranking and selection of the optimal output.

The scoring function illustrated in FIG. 5 operates as follows: at each decoding step, the decoder generates raw logit scores over all possible next tokens in the vocabulary. From these logit scores, the system identifies the tokens having the highest logit score values and selects these top candidates for beam expansion, thereby generating extended candidate sequences. For each candidate token selected during expansion, the system calculates a conditional probability by converting the raw logit score to a normalized confidence score representing the likelihood of that token appearing at the current position given the specific sequence of tokens already predicted and given the visual features extracted from the input check image. These normalized confidence scores are used for evaluating and reranking the generated sequences rather than for the initial token selection during expansion.

These conditional probabilities are then accumulated across the sequence length to produce a cumulative confidence score for each complete candidate sequence. By default, most implementations perform this accumulation by averaging the log probabilities. In some embodiments, the system may be configured to instead average confidence scores across the decoded token positions, providing a normalized metric that facilitates comparison of candidate sequences of varying lengths. The resulting cumulative scores enable direct comparison of candidate sequences of varying lengths and content, providing a unified metric for identifying the most likely correct interpretation of the check amount text.

After all candidate sequences have been scored at a given decoding step, the system performs a pruning operation to retain the specified number of top-ranked sequences (five sequences in the example shown in FIG. 5). This pruning prevents exponential growth in the number of active candidate sequences while maintaining sufficient diversity to explore alternative interpretations that may ultimately prove more accurate than the initially highest-scoring predictions.

The confidence-based beam search scoring process illustrated in FIG. 5 may be implemented on either the user device or the remote server as described in connection with FIG. 1. In embodiments where the OCR model executes on the user device (such as a mobile phone or tablet), the scoring function operates locally on the device's processor or graphics processing unit, enabling immediate recognition results without network transmission delays and preserving user privacy by avoiding transmission of check images to external servers. In alternative embodiments where the OCR model executes on the remote server, the user device captures the check image and transmits it to the server, where the confidence-based beam search scoring is performed using the server's computational resources, potentially enabling use of larger, more accurate models that exceed the memory or processing constraints of mobile devices. The mathematical formulation shown in FIG. 5 applies equally to both deployment architectures, with the beam width parameter and top-s selection criteria configurable based on the available computational resources at the execution location.

The scoring function depicted in FIG. 5 represents a departure from conventional OCR decoding strategies in two significant respects. First, by using normalized confidence score rather than raw logit outputs, the system ensures numerical stability and comparability across different token positions and vocabulary items. Second, by evaluating sequences based on cumulative confidence score across multiple tokens rather than selecting tokens based solely on maximum probability at each individual step, the system achieves more robust recognition that is less susceptible to error propagation from early misclassifications.

Method for Enhanced Beam Search Decoding in Transformer-Based OCR Systems

Figure 6:
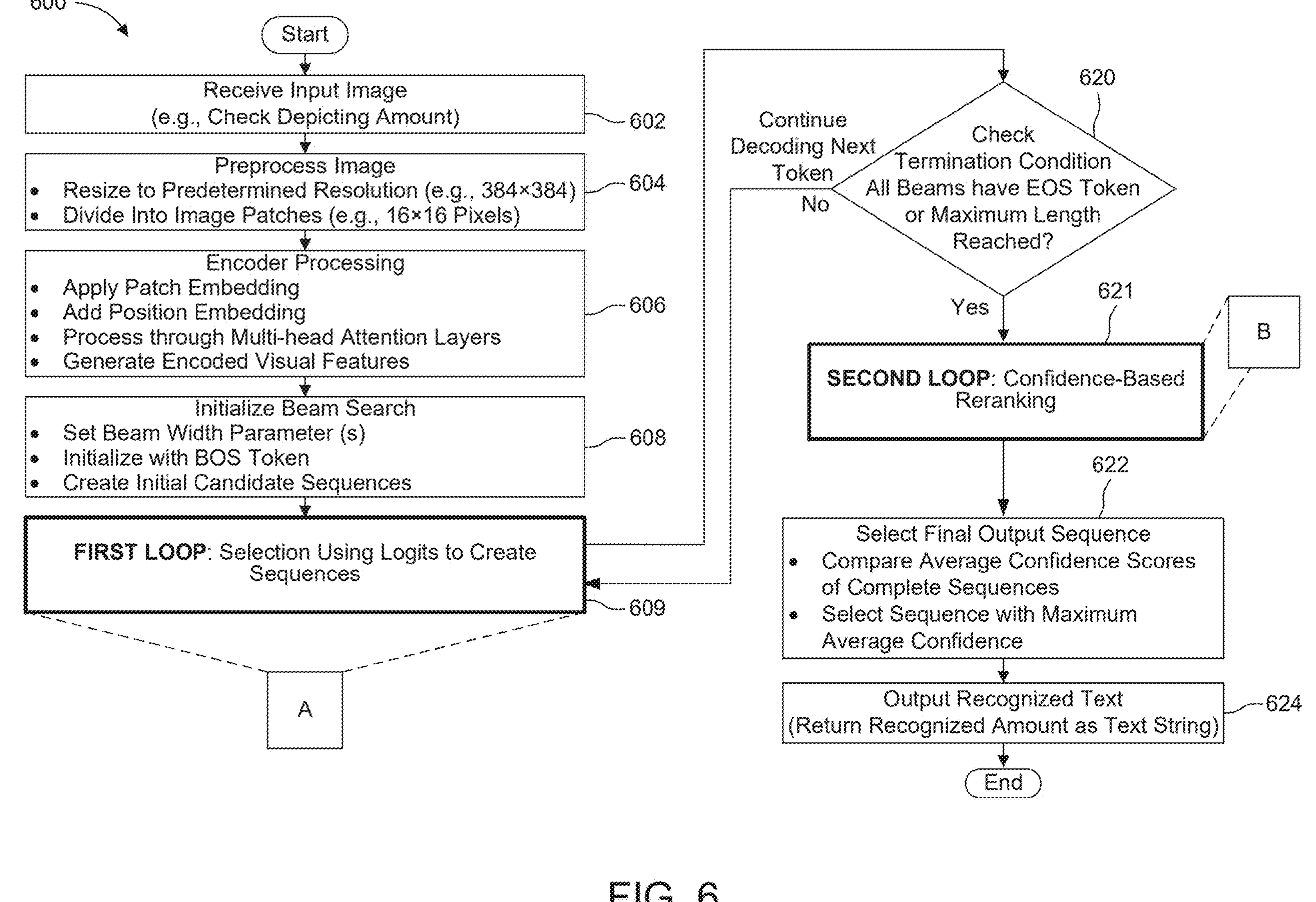
FIG. 6 is a flowchart illustrating an example method for enhanced beam search decoding in a transformer-based optical character recognition (OCR) system according to an embodiment of the present disclosure.
Figure 6:
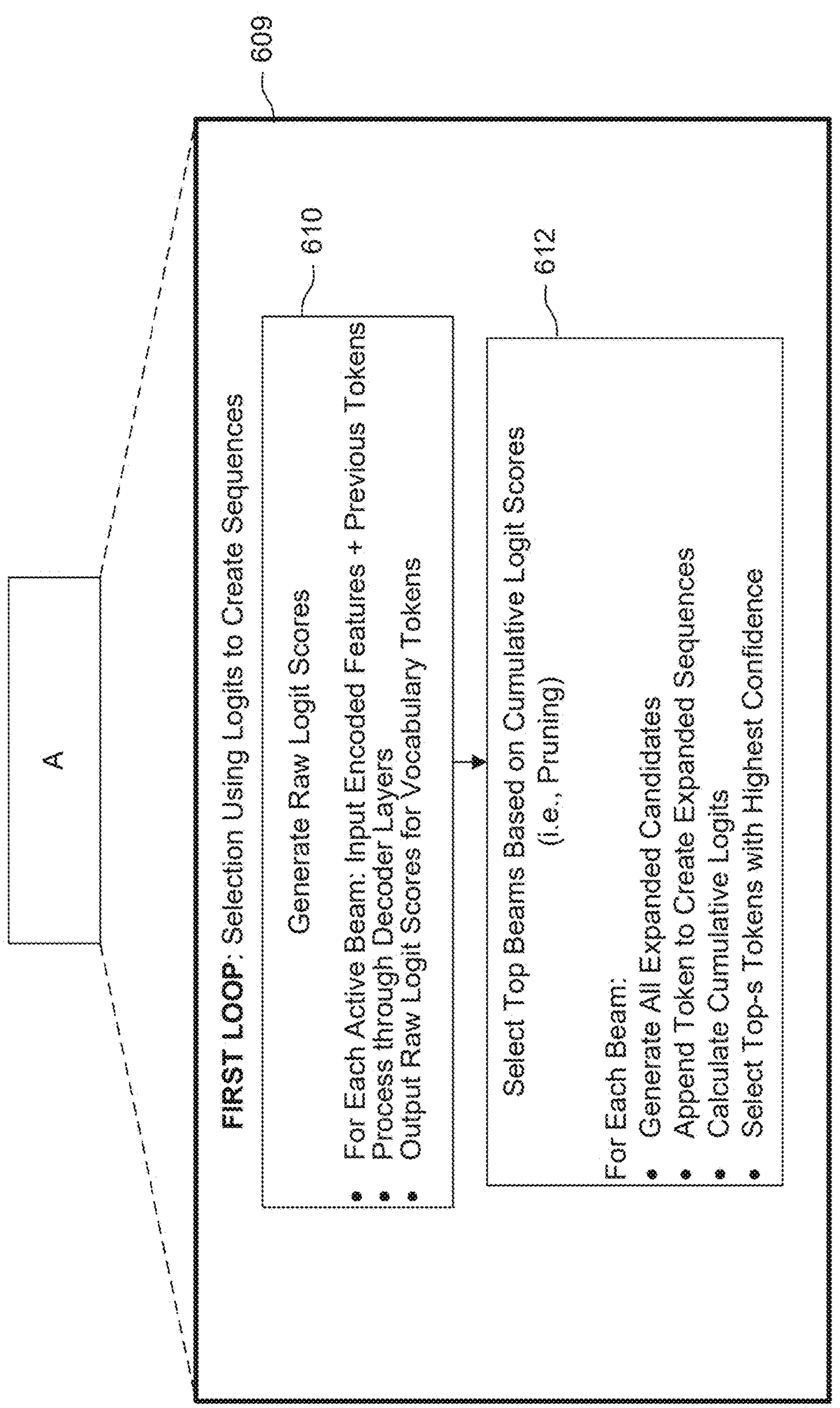
Figure 6:
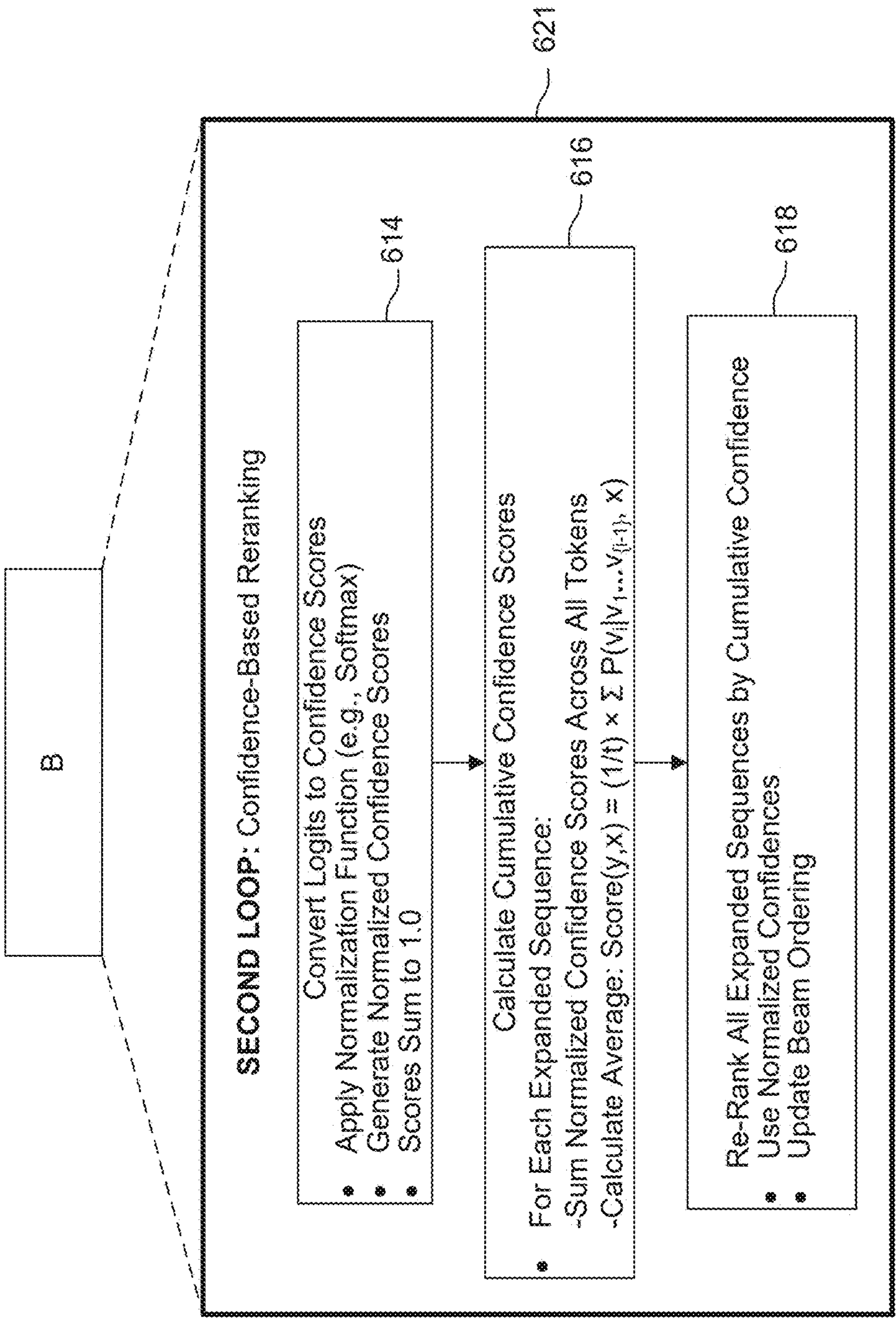

FIG. 6 is a flowchart illustrating an example method 600 for enhanced beam search decoding in a transformer-based optical character recognition (OCR) system according to an embodiment of the present disclosure. FIG. 6 (Continued), designated "A", illustrates the first loop comprising logit-based sequence generation. FIG. 6 (Continued), designated "B", illustrates the second loop comprising confidence-based reranking.

The method 600 integrates the encoder architecture of FIG. 2, the iterative beam search process of FIG. 3, the candidate sequence evaluation of FIG. 4, and the mathematical scoring formulation of FIG. 5 into a unified operational flow. In addition, in some implementations, the OCR method 600 described herein can be implemented as part of a mobile check deposit process or system, such as the one described in U.S. patent application Ser. No. 19/267,178, which was filed Jul. 11, 2025, and which is incorporated herein by reference in its entirety for any and all purposes.

At step 602, an input image is received by the OCR system. In one embodiment, the input image depicts a check containing a handwritten or printed amount to be recognized. The input image may be captured by an image capture device, received from a scanning device, or retrieved from a storage medium.

At step 604, the input image undergoes preprocessing. The preprocessing may include resizing the input image to a predetermined resolution, such as 384×384 pixels. The resized image is then divided into a plurality of image patches. In an example implementation, each image patch may comprise a 16×16 pixel region. The division results in a sequence of non-overlapping or partially overlapping patches that collectively represent the input image.

At step 606, encoder processing is performed on the preprocessed image patches. Each image patch is flattened into a one-dimensional vector and processed through a patch embedding layer to generate patch embeddings. Position embeddings are added to the patch embeddings to retain spatial information regarding the location of each patch within the input image. The combined embeddings are then processed through a plurality of encoder layers, each comprising multi-head self-attention mechanisms and feed-forward neural networks, as illustrated in FIG. 2. The encoder generates encoded visual features that represent the content of the input image in a latent feature space.

At step 608, beam search decoding is initialized. A beam width parameter(s) is set, wherein the beam width parameter determines the number of candidate sequences to be maintained at each decoding step. In various embodiments, the beam width parameter may be set to values such as s=3 or s=5. The decoding process is initialized with a beginning-of-sequence (BOS) token, which serves as the starting point for generating candidate sequences. Initial candidate sequences are created, each beginning with the BOS token.

At step 609, the method enters a first loop designated as "Selection Using Logits to Create Sequences," as shown in FIG. 6 (Continued), designated "A". This first loop represents a logit-based sequence generation phase wherein candidate sequences are generated and initially selected based on raw logit scores output by the decoder. The first loop comprises steps 610 and 612, which are executed to generate and select candidate sequences using unnormalized logit values. This logit-based selection creates multiple candidate paths through the vocabulary space that will subsequently be evaluated using normalized confidence scores in the second loop. The first loop operates to expand the search space by identifying high-scoring average token logit sequences according to the raw decoder outputs, enabling exploration of multiple hypothetical recognition paths before confidence-based reranking is applied.

At step 610, a decoder step is performed to generate raw logit scores. For each active candidate sequence in the current beam, the decoder receives the encoded visual features from step 606 and the sequence of previously generated tokens. The decoder processes this input through a plurality of decoder layers, each comprising masked multi-head self-attention mechanisms, encoder-decoder multi-head attention mechanisms, and feed-forward neural networks, as illustrated in FIG. 2. The decoder outputs raw logit scores for each token in the vocabulary, wherein the raw logit scores represent unnormalized predictions for the next token in the sequence. The raw logit scores generated at this step are used for the sequence expansion and selection process.

At step 612, the top beams are selected based on average logit scores. For each beam, the system generates all expanded candidates by appending tokens to create expanded sequences and calculating cumulative logits. The system selects the top-s tokens with highest logit scores, where s corresponds to the beam width parameter. The system then ranks all expanded candidate sequences according to their cumulative logit scores to retain the top-s sequences. This selection based on average logit scores identifies the most promising candidate sequences according to the unnormalized decoder outputs, creating a set of candidate sequences that will be further refined through confidence-based reranking in the second loop. The logit-based selection at this step ensures computational efficiency by pruning the search space before applying the more sophisticated confidence-based evaluation.

At step 620, a termination condition is evaluated. The method determines whether all active candidate sequences in the beam have generated an end-of-sequence (EOS) token or whether a maximum sequence length has been reached. If the termination condition is not satisfied (NO branch), the method returns to step 610 (via step 620's "Continue Decoding Next Token" path) to continue decoding the next token position, re-entering the first loop at step 609. If the termination condition is satisfied (YES branch), the method proceeds to step 621.

At step 621, the method enters a second loop designated as "Confidence-Based Reranking," as shown in FIG. 6 (Continued), designated "B". This second loop represents a confidence-based evaluation phase wherein the candidate sequences generated in the first loop are reranked based on normalized confidence scores rather than raw logit values. The second loop comprises steps 614, 616, and 618, which are executed to convert logits to confidence scores, calculate cumulative confidence scores, and perform reranking. This confidence-based reranking phase enables the system to select optimal sequences that exhibit high average confidence across all tokens, thereby improving recognition accuracy for challenging character combinations such as those found in check amounts. The second loop distinguishes the disclosed approach from conventional beam search implementations that rely solely on logit-based scoring.

At step 614, the raw logit scores are converted to confidence scores. A normalization function, such as a softmax function, is applied to the raw logit scores to generate normalized confidence scores. The normalized confidence scores represent probabilities for each token in the vocabulary, wherein the scores sum to 1.0 across the entire vocabulary. Each confidence score indicates the likelihood that a particular token is the correct next token in the sequence. The normalized confidence scores generated at this step are used for the reranking in subsequent steps rather than for the initial sequence expansion, which relies on the raw logit scores from the first loop.

At step 616, cumulative confidence scores are calculated for each expanded candidate sequence. For each expanded sequence generated in the first loop, the normalized confidence scores of all tokens in the sequence are summed and then averaged by dividing by the sequence length (t). The cumulative confidence score for a sequence y given input image x may be calculated according to the formula:

$$\text{Score}(y,x)=(1/t)\times\Sigma(i=1\text{ to }t)P(v_i|v_t,\ldots,v_{(i-1)},x)$$

wherein $v_i$ represents the i-th token in the sequence, P represents the normalized confidence score (probability), and t represents the current sequence length. This averaging process prevents bias toward shorter sequences, as illustrated in FIG. 5.

At step 618, all expanded candidate sequences are reranked using the cumulative confidence scores calculated in step 616. The system ranks all expanded candidate sequences according to their cumulative confidence scores. The system uses the normalized confidences to update the beam ordering, which may result in a different ordering compared to the logit-based ranking from the first loop. This reranking process is illustrated in FIG. 4.

At step 622, a final output sequence is selected from the candidate sequences. The cumulative confidence scores of all complete sequences are compared, and the sequence with the maximum average cumulative confidence score is selected as the final output sequence. This selection ensures that the most likely complete sequence, as determined by the model's confidence across all token positions, is chosen as the recognition result.

At step 624, the recognized text is output. The final output sequence selected in step 622 is returned as a text string representing the recognized content of the input image. In embodiments where the input image depicts a check amount, the output text string represents the recognized numerical amount. The recognized text may be stored in memory, transmitted to another system, displayed to a user, or used for further processing such as financial transaction validation.

The method 600 illustrated in FIG. 6 provides a comprehensive process flow for enhanced beam search decoding that leverages normalized confidence scores and cumulative averaging to improve recognition accuracy compared to conventional beam search approaches. By maintaining multiple candidate sequences and selecting based on averaged confidence scores rather than raw logit sums, the method achieves improved performance particularly for sequences of varying lengths.

Computing Environment

Figure 7:
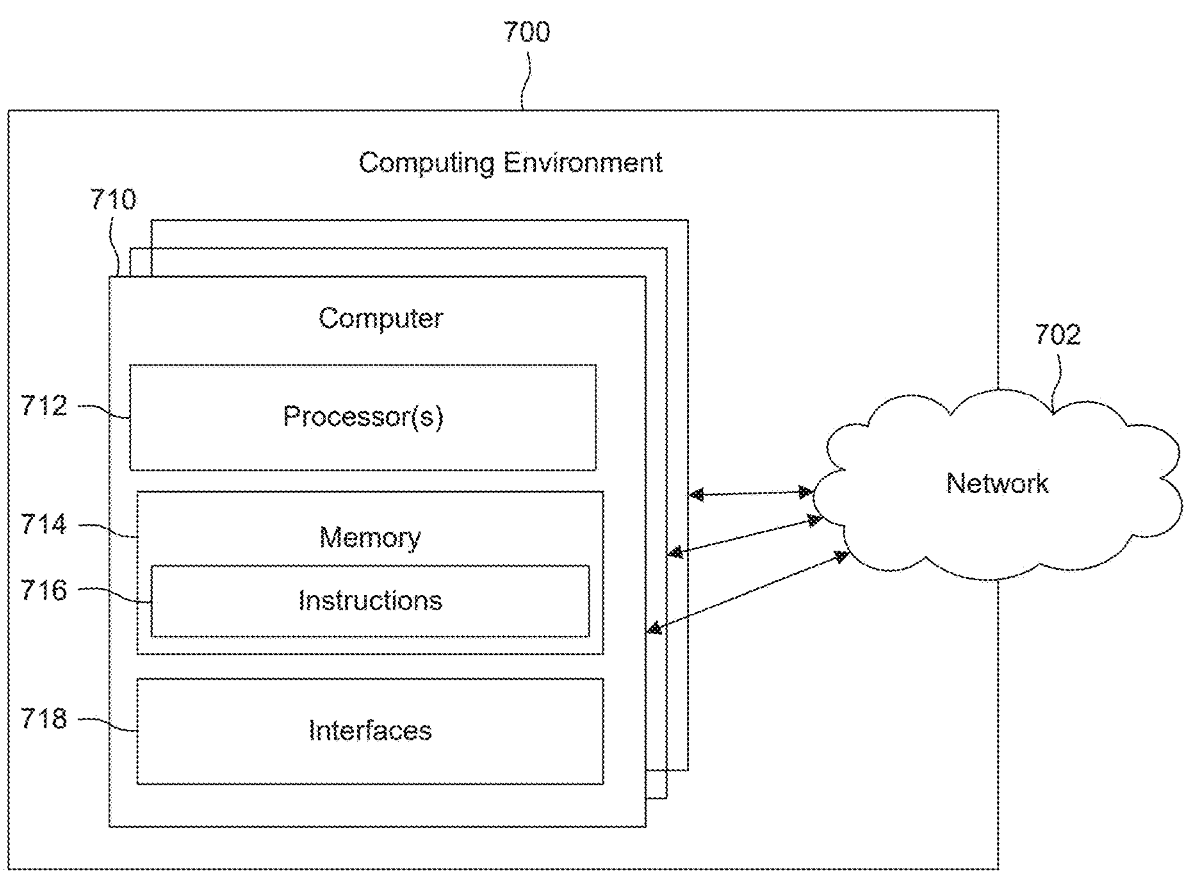
FIG. 7 illustrates a computing environment suitable for implementing aspects of the present disclosure.

FIG. 7 discloses a computing environment 700 in which aspects of the present disclosure may be implemented. A computing environment 700 is a set of one or more virtual or physical computers 710 that individually or in cooperation achieve tasks, such as implementing one or more aspects described herein. The computers 710 have components that cooperate to cause output based on input. Example computers 710 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 700 includes at least one physical computer.

The computing environment 700 may specifically be used to implement one or more aspects described herein. In some examples, one or more of the computers 710 may be implemented as a user device, such as mobile device and others of the computers 710 may be used to implement aspects of a machine learning framework useable to train and deploy models exposed to the mobile device or provide other functionality, such as through exposed application programming interfaces.

The computing environment 700 can be arranged in any of a variety of ways. The computers 710 can be local to or remote from other computers 710 of the environment 700. The computing environment 700 can include computers 710 arranged according to client-server models, peer-to-peer models, edge computing models, other models, or combinations thereof.

In many examples, the computers 710 are communicatively coupled with devices internal or external to the computing environment 700 via a network 702. The network 702 is a set of devices that facilitate communication from a sender to a destination, such as by implementing communication protocols. Example networks 702 include local area networks, wide area networks, intranets, or the Internet.

In some implementations, computers 710 can be general-purpose computing devices (e.g., consumer computing devices). In some instances, via hardware or software configuration, computers 710 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use. Such relatively low powered device may nonetheless be specially configured for such inference tasks so that it performs inference faster or more efficiently than a standard desktop or laptop computer.

Many example computers 710 include a processor set 712, a memory set 714, and an interface set 718. Such components can be virtual, physical, or combinations thereof.

The processor set 712 is a set of one or more processors. Processors are components that execute instructions, such as instructions that obtain data, process the data, and provide output based on the processing. The processor set 712 often (collectively or individually) obtain instructions and data stored by the memory set 714. The processors of the processor set 712 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the processor set 712 includes at least one physical processor implemented as an electrical circuit. Example providers or designers of processors 712 include INTEL, AMD, QUALCOMM, TEXAS INSTRUMENTS, and APPLE.

The memory set 714 is a collection of components configured to store instructions 716 and data for later retrieval and use. The instructions 716 can, when executed by one or more processors of processor set 712, cause execution of one or more operations that implement aspects described herein. In many examples, the memory 714 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, the memory set 714 can include transitory memory that stores information encoded in transient signals.

The interface set 718 is a set of one or more components that facilitate receiving input from and providing output to something external to the computer 710, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The interfaces set 718 can include one or more components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 718 can facilitate connection of the computing environment 700 to a network 702.

The computers 710 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT or other flagship models (GPT-40, 01, 03, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

Although the example embodiments described herein involve determining a check amount from check imagery, these embodiments are not limited to checks. One skilled in the relevant art will readily appreciate that the techniques disclosed may be applied to a wide range of financial and business documents-such as invoices, receipts, bills, purchase orders, and financial statements- or to any document containing monetary amounts, transaction details, or financial data requiring accurate extraction and processing from image-based sources.

Likewise, while the embodiments are illustrated in the context of determining a check amount, the disclosed techniques are broadly applicable to other optical character recognition tasks. For example, they may be used to extract monetary amounts from invoices, receipts, bills, purchase orders, or financial statements, as well as to extract other alphanumeric information from documents or any image-based source requiring reliable text extraction.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for optical character recognition of imagery, the method comprising:

receiving an input image depicting an amount;

processing the input image through an encoder of a transformer-based optical character recognition model to generate encoded visual features;

performing sequential decoding of the amount using a decoder of the transformer-based optical character recognition model, wherein performing the sequential decoding comprises:

at each decoding step, generating, by the decoder, output values comprising raw logit scores for tokens in a vocabulary of possible tokens, the output values being conditioned on the encoded visual features and any previously decoded tokens;

converting the output values from raw logit scores to normalized confidence scores using a normalization function;

generating and maintaining a plurality of candidate output sequences based on the raw logit scores during the sequential decoding, each candidate output sequence comprising one or more decoded tokens, wherein maintaining the plurality of candidate output sequences comprises, at each decoding step, expanding candidate output sequences based on the raw logit scores, pruning lower-scoring candidate output sequences based on average logit scores to retain a predetermined number of highest-scoring candidate output sequences, and then reranking the retained candidate output sequences based on logit scores calculated by averaging logit scores;

for each candidate output sequence, calculating a cumulative confidence score by averaging the logit scores across all tokens of that candidate output sequence to enable reranking of the generated candidate output sequences;

selecting a final output sequence from among the plurality of candidate output sequences based on the cumulative confidence scores, the final output sequence having a maximum cumulative confidence score; and outputting the final output sequence as a recognized textual representation of the amount.

2. The method of claim 1, wherein the final output sequence selected based on the maximum cumulative confidence score differs from a candidate output sequence that would have a highest cumulative logit score if cumulative logit scores were calculated by averaging the raw logit scores without conversion to normalized confidence scores.

3. The method of claim 1, wherein calculating the cumulative confidence score by averaging the logit scores comprises dividing a sum of the logit scores by a total number of tokens in the candidate output sequence.

4. The method of claim 1, wherein the expanding candidate output sequences based on the raw logit scores creates expanded candidate output sequences, the pruning is pruning of the expanded candidate output sequences, and maintaining the plurality of candidate output sequences further comprises, at each decoding step:

for each retained expanded candidate output sequence, calculating an updated cumulative confidence score by averaging logit scores across all tokens in that expanded candidate output sequence; and wherein, the reranking the retained expanded candidate output sequences is based on the updated cumulative confidence scores.

5. The method of claim 1, wherein the predetermined number of highest-scoring expanded candidate output sequences is defined by a configurable beam width parameter.

6. The method of claim 5, wherein the configurable beam width parameter is set to a value of at least 3.

7. The method of claim 5, wherein the configurable beam width parameter is set to a value of 5.

8. The method of claim 1, wherein expanding each candidate output sequence comprises:

identifying a subset of tokens having highest logit score values from the raw logit scores generated at the decoding step; and creating new candidate output sequences by appending each token in the subset to the candidate output sequence being expanded.

9. The method of claim 1, wherein processing the input image through the encoder comprises:

dividing the input image into a plurality of image patches;

flattening each image patch into a one-dimensional vector;

applying position embeddings to the flattened vectors to encode spatial position information; and processing the flattened vectors with the position embeddings through a series of transformer encoder layers to generate the encoded visual features.

10. The method of claim 1, wherein the vocabulary of possible tokens includes a plurality of numerical digits, one or more special characters comprising any one or a combination of: a dollar sign, a dash, a slash, an asterisk, and a decimal point, and a control token comprising at least an end-of-sequence token.

11. The method of claim 1, wherein the method is performed on a user mobile device, and wherein the input image is captured by a camera of the user mobile device.

12. The method of claim 1, wherein the method is performed on a remote server, and wherein the input image is received from a user mobile device via a network connection.

13. The method of claim 1, further comprising:

comparing the recognized text representation of the amount to a courtesy amount or legal amount indicated in the input image; and based on the comparison, determining whether to accept or reject a deposit transaction associated with the input image.

14. The method of claim 1, wherein the transformer-based optical character recognition model comprises:

a vision transformer encoder configured to process the input image and generate the encoded visual features; and an autoregressive decoder configured to generate the output values at each decoding step based on the encoded visual features and previously decoded tokens.

15. The method of claim 1, wherein the normalized confidence scores at each decoding step sum to one across the entire vocabulary.

16. The method of claim 1, wherein maintaining the plurality of candidate output sequences comprises retaining a candidate output sequence that includes a lower normalized confidence score value at a first decoding step when one or more subsequent tokens in that candidate output sequence have higher normalized confidence scores that result in a higher cumulative confidence score for that candidate output sequence compared to other candidate output sequences.

17. The method of claim 1, wherein selecting the final output sequence based on cumulative confidence scores differs from a greedy decoding approach that selects a single highest-confidence token at each decoding step based on raw logit scores.

18. The method of claim 1, wherein the input image depicts the amount with one or more special characters selected from the group consisting of dollar signs, asterisks, and decimal points.

19. A system for optical character recognition of imagery, the system comprising:

a processor; and a non-transitory computer-readable memory storing instructions that, when executed by the processor, cause the system to:

receive an input image depicting an amount;

process the input image through an encoder of a transformer-based optical character recognition model to generate encoded visual features;

perform sequential decoding of the amount using a decoder of the transformer-based optical character recognition model, wherein performing the sequential decoding comprises:

at each decoding step, generating, by the decoder, output values comprising raw logit scores for tokens in a vocabulary of possible tokens, the output values being conditioned on the encoded visual features and any previously decoded tokens;

converting the output values from raw logit scores to normalized confidence scores using a normalization function;

generating and maintaining a plurality of candidate output sequences based on the raw logit scores during the sequential decoding, each candidate output sequence comprising one or more decoded tokens, and wherein maintaining the plurality of candidate output sequences comprises, at each decoding step, expanding candidate output sequences based on the raw logit scores, pruning lower-scoring candidate output sequences based on average logit scores to retain a predetermined number of highest-scoring candidate output sequences, and then reranking the retained candidate output sequences based on logit scores calculated by averaging logit scores;

for each candidate output sequence, calculating a cumulative confidence score by averaging the logit scores across all tokens of that candidate output sequence;

selecting a final output sequence from among the plurality of candidate output sequences based on the cumulative confidence scores, the final output sequence having a maximum cumulative confidence score; and output the final output sequence as a recognized textual representation of the amount.

20. A non-transitory computer-readable storage medium storing instructions that, when executed by a processor, cause the processor to perform operations comprising:

receiving an input image depicting an amount;

processing the input image through an encoder of a transformer-based optical character recognition model to generate encoded visual features;

performing beam search decoding of the amount using a decoder of the transformer-based optical character recognition model, wherein the beam search decoding comprises:

initializing a plurality of beams, each beam representing a candidate output sequence;

at each decoding step:

for each beam of the plurality of beams, generating, by the decoder, output values comprising raw logit scores for tokens in a vocabulary of possible next tokens, the output values being conditioned on the encoded visual features and tokens already present in that beam;

converting the output values from raw logit scores to normalized confidence scores using a normalization function;

expanding each beam based on the raw logit scores by appending possible next tokens selected according to the raw logit scores to create expanded candidate output sequences;

pruning the expanded candidate output sequences based on average logit scores to retain a predetermined beam width number of highest-scoring expanded candidate output sequences as beams for a subsequent decoding step;

for each retained expanded candidate output sequence, calculating a cumulative confidence score by averaging the logit scores across all tokens in that expanded candidate output sequence; and reranking the retained expanded candidate output sequences based on the cumulative confidence scores;

continuing the beam search decoding until an end-of-sequence token is generated or a maximum sequence length is reached;

selecting a final output sequence having a maximum cumulative confidence score from among the beams; and outputting the final output sequence as a recognized textual representation of the amount for use in remote processing.

* * * * *